US012598347B2

(12) United States Patent
Kang

(10) Patent No.: US 12,598,347 B2
(45) Date of Patent: Apr. 7, 2026

(54) SIGNAL PROCESSING DEVICE AND IMAGE DISPLAY APPARATUS INCLUDING THE SAME

(71) Applicant: LG ELECTRONICS INC., Seoul (KR)

(72) Inventor: Byeongkook Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/784,794

(22) Filed: Jul. 25, 2024

(65) Prior Publication Data

US 2025/0047932 A1 Feb. 6, 2025

(30) Foreign Application Priority Data

Aug. 1, 2023 (KR) ........................ 10-2023-0100186

(51) Int. Cl.
*H04N 21/434* (2011.01)
*H04N 21/426* (2011.01)

(52) U.S. Cl.
CPC ..... *H04N 21/434* (2013.01); *H04N 21/42607* (2013.01)

(58) Field of Classification Search
CPC ........................ H04N 21/434; H04N 21/42607
See application file for complete search history.

(56) References Cited

U.S. PATENT DOCUMENTS

| | | | | |
|---|---|---|---|---|
| 9,882,731 B2 * | 1/2018 | Ko | ........................ | H04H 60/73 |
| 9,998,572 B2 * | 6/2018 | Kwon | ..................... | H04L 69/22 |
| 10,728,590 B2 * | 7/2020 | Kwon | ..................... | H04L 69/04 |
| 2018/0048932 A1 * | 2/2018 | Eyer | ............... | H04N 21/64322 |

(Continued)

FOREIGN PATENT DOCUMENTS

| | | | | | |
|---|---|---|---|---|---|
| CN | 111373762 A | * | 7/2020 | ......... | H04N 21/4312 |
| CN | 111954030 A | * | 11/2020 | ............. | H04L 65/65 |

(Continued)

OTHER PUBLICATIONS

Korean Intellectual Property Office Application No. 10-2023-0100186, Notice of Allowance dated Feb. 28, 2025, 2 pages.

*Primary Examiner* — John W Miller

(74) *Attorney, Agent, or Firm* — LEE, HONG, DEGERMAN, KANG & WAIMEY

(57) ABSTRACT

A signal processing device according to an embodiment of the present disclosure includes: a broadcast receiver including a tuner; and a controller, the controller being configured to: receive, via the tuner, a broadcast signal consisting of a plurality of physical layer pipes (PLPs) corresponding to a plurality of channels; determine, from among the plurality of PLPs, a PLP carrying program information about a first channel, which is a preset broadcast channel; in case where program information about the first channel is provided through a first PLP corresponding to the first channel, process the first PLP to obtain the program information about the first channel; and in case where program information about the first channel is provided through a second PLP corresponding to a second channel, process the second PLP to obtain the program information about the first channel. Other various embodiments are possible.

15 Claims, 15 Drawing Sheets

(56)                     References Cited

U.S. PATENT DOCUMENTS

2020/0169685 A1 *    5/2020   Clift ................. H04N 21/42615
2021/0195253 A1 *    6/2021   Yang .................. H04N 21/4343

FOREIGN PATENT DOCUMENTS

KR        1020160021539         2/2016
KR        1020160056727         5/2016
KR        1020160097024         8/2016
KR              102197968  B1 *  1/2021   ............. H04L 69/08
KR        1020230017241         2/2023
WO        WO-2017014586  A1 *   1/2017   ......... H04N 21/2362

* cited by examiner

<u>1</u>

| Media Processing Unit (MPU) | | signaling | signaling | NRT | DASH | NRT | signaling |
|---|---|---|---|---|---|---|---|
| MPU mode payload | | | | | | | |

| SLT | MPEG Media Transport Protocol (MMTP) | | ROUTE (ALC/LCT) | HTTP |
|---|---|---|---|---|
| UDP | UDP | | UDP | TCP |
| IP | IP | | IP | IP |
| ATSC 3.0 Link Layer Protocol | | | | Data Link Layer |
| ATSC 3.0 Physical Layer | | | | Physical Layer |

Broadcast                                        Broadband

SIGNAL PROCESSING DEVICE AND IMAGE DISPLAY APPARATUS INCLUDING THE SAME

CROSS-REFERENCE TO RELATED APPLICATION(S)

Pursuant to 35 U.S.C. § 119, this application claims the benefit of earlier filing date and right of priority to Korean Application No(s). 10-2023-0100186, filed on Aug. 1, 2023, the contents of which are all incorporated by reference herein in its entirety.

BACKGROUND

1. Field

The present disclosure relates to a signal processing device and an image display apparatus including the signal processing device.

2. Description of the Related Art

A signal processing device is a device that processes a signal, such as a terrestrial broadcast signal, to provide an image. For example, the signal processing device may receive a broadcast signal or an HDMI signal to perform signal processing based on the received broadcast signal or the HDMI signal and output the signal-processed image signal.

With the recent development of electronic technology, the spread of image display apparatuses or displays configured to output a high-quality image is increasing. An image display apparatus or device has the function of displaying an image that can be viewed by a user. Representative examples include a Liquid Crystal Display (LCD) device using liquid crystals and an Organic Light-Emitting Diode (OLED) device using OLEDs.

Meanwhile, digital broadcasting technology is a broadcasting technique that allows for transmission of large-volume data. ATSC 3.0 standardization has been developed by the advanced television system committee (ATSC) of the United States, and ATSC 3.0 has been adopted by and used in various countries such as Canada, South Korea, etc. Thus, various research has been conducted to seek ways to process signals more efficiently in accordance with the scheme proposed by ATSC 3.0.

SUMMARY

It is an objective of the present disclosure to solve the above and other problems.

It is another objective of the present disclosure to provide a signal processing device that can obtain program information about a channel set to a broadcast channel without omission, and an image display apparatus including the same.

According to one aspect of the subject matter described in this application, a signal processing device includes: a broadcast receiver including a tuner; and a controller, the controller being configured to: receive, via the tuner, a broadcast signal consisting of a plurality of physical layer pipes (PLPs) corresponding to a plurality of channels; determine, from among the plurality of PLPs, a PLP carrying program information about a first channel, which is a preset broadcast channel; in case where program information about the first channel is provided through a first PLP corresponding to the first channel, process the first PLP to obtain the program information about the first channel; and in case where program information about the first channel is provided through a second PLP corresponding to a second channel, process the second PLP to obtain the program information about the first channel.

According to another aspect, a signal processing device includes: a broadcast receiver including a tuner; and a controller, the controller being configured to: receive, via the tuner, a broadcast signal consisting of a plurality of physical layer pipes (PLPs) corresponding to a plurality of channels; process a first PLP corresponding to the first channel, which is a preset broadcast channel, to determine whether program information about the first channel is provided through the first PLP; in case where program information about the first channel is not provided through the first PLP, determine, from among the plurality of PLPs, a PLP carrying program information about the first channel; and in case where program information about the first channel is provided through a second PLP corresponding to a second channel, process the second PLP to obtain the program information about the first channel.

According to another aspect, an image display apparatus includes: a broadcast receiver including a tuner; a display; and a controller, the controller being configured to: receive, via the tuner, a broadcast signal consisting of a plurality of physical layer pipes (PLPs) corresponding to a plurality of channels; determine, from among the plurality of PLPs, a PLP carrying program information about a first channel, which is a preset broadcast channel; in case where program information about the first channel is provided through a first PLP corresponding to the first channel, process the first PLP to obtain the program information about the first channel; in case where program information about the first channel is provided through a second PLP corresponding to a second channel, process the second PLP to obtain the program information about the first channel; and process the first PLP after obtaining the program information about the first channel to output, via the display, an image of the first channel along with the program information about the first channel.

A signal processing device and an image display apparatus including the same have the following effects.

According to at least one of the embodiments of the present disclosure, it is possible to obtain program information about a channel set to a broadcast channel from a broadcast signal consisting of a plurality of physical layer pipes (PLPs) without any omission.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

DETAILED DESCRIPTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

Figure 1:
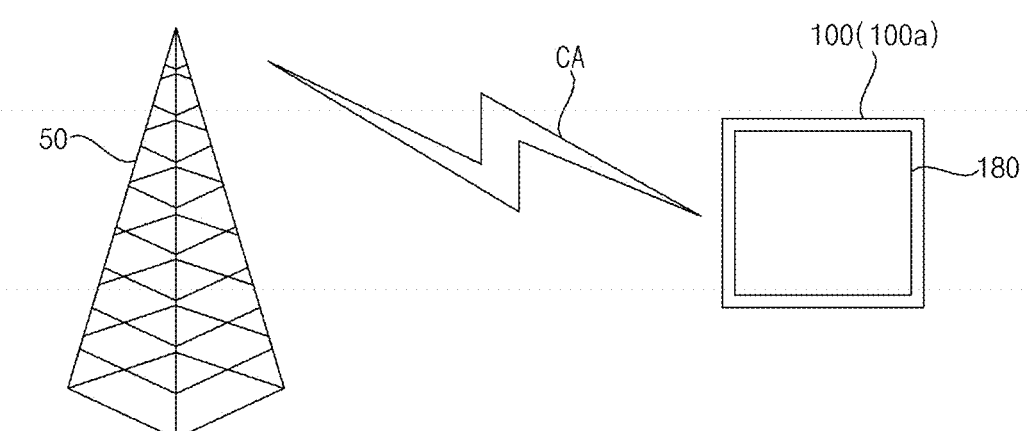
FIG. 1 is a diagram illustrating a broadcast system according to an embodiment of the present disclosure.

FIG. 1 is a diagram illustrating a broadcast system according to an embodiment of the present disclosure.

Referring to FIG. 1, a broadcast system 1 may include a broadcast transmitter 50 to transmit a broadcast signal CA, and a broadcast receiver 100 to receive the broadcast signal CA.

The broadcast transmitter 50 may transmit a broadcast signal CA corresponding to data provided by a broadcasting service provider such as a broadcast station, etc. The broadcast signal CA may be a radio frequency (RF) signal. The broadcast signal CA may be a digital broadcast signal. The broadcast signal CA may be a broadcast signal based on the ATSC 3.0 standard.

Meanwhile, according to the ATSC 3.0 standard, the broadcast transmitter 50 may transmit a broadcast signal CA including an Electronic Service Guide (ESG) for an on-screen guide to scheduled broadcast programs and/or an Emergency Alert System (EAS) to provide emergency information.

The broadcast receiver 100 may process the received broadcast signal CA. The broadcast receiver 100 may be referred to as a signal processing device 100a that processes a broadcast signal CA. For example, the signal processing device 100a may be a device configured to process a broadcast signal CA and provide an image signal to a monitor or the like that outputs an image.

When the broadcast receiver 100 includes a display 180 configured to display an image, the broadcast receiver 100 may be referred to as an image display apparatus 100. That is, the image display apparatus 100 may include the signal processing device 100a configured to process a broadcast signal CA and the display 180. For example, the broadcast receiver 100 may be an image display apparatus 100, such as a TV, a smart phone, a tablet PC, or the like, which processes a broadcast signal CA through the signal processing device 100a and outputs an image through the display 180.

Figures 2, 3:
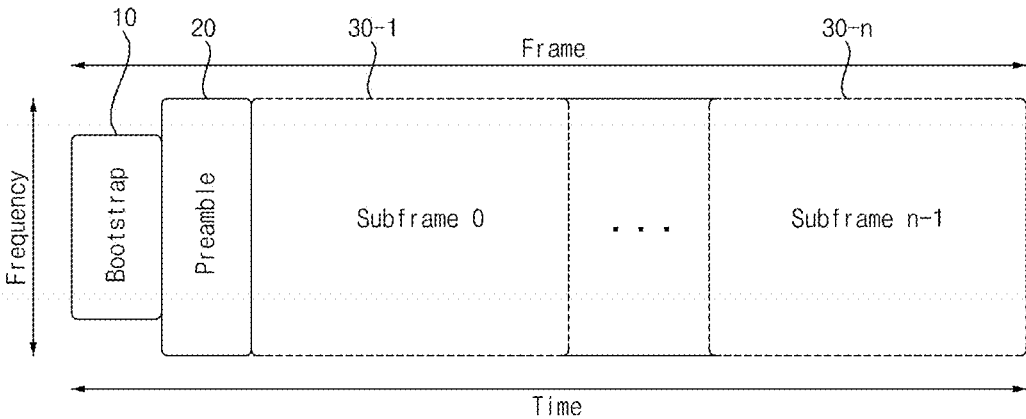
FIG. 2 is a diagram for explaining a protocol stack defined in the ATSC 3.0 standard, according to an embodiment of the present disclosure.
FIG. 3 is a diagram for explaining a frame structure defined in the ATSC 3.0 standard, according to an embodiment of the present disclosure.

FIG. 2 a diagram for explaining a protocol stack defined in the ATSC 3.0 standard, according to an embodiment of the present disclosure.

Referring to FIG. 2, the broadcast transmitter 50 may process a broadcast service according to a protocol stack defined in the ATSC 3.0 standard to transmit a broadcast signal CA.

In the case of a broadcast protocol stack, two methods may be used for broadcast service delivery. A first method is based on MPEG Media Transport (MMT), which uses an MMT Protocol (MMTP) to deliver Media Processing Units (MPUs). A second method is based on MPEG DASH (Dynamic Adaptive Streaming over HTTP), which uses Real time Object delivery over Unidirectional Transport (ROUTE) to deliver DASH segments.

Signaling may be delivered over MMTP and/or ROUTE. Bootstrap signaling may be provided via a Service List Table (SLT). The MMTP may transmit signaling and service data, such as audio data and video data for providing the broadcast service, formatted in the MPU format defined in the MMT. In this case, the service data and signaling may be encapsulated through a User Datagram Protocol (UDP) layer and an Internet Protocol (IP) layer.

ROUTE may transmit service data formatted in the DASH segment format, signaling, and non-timed data such as Non-Real Time (NRT). In this case, the service data and non-timed data may be encapsulated through the UDP and IP layers.

Meanwhile, the part transmitted through SLT, MMTP, and ROUTE may be processed in the UDP and IP layers, and then re-encapsulated in a link layer (ATSC 3.0 Link Layer Protocol). The data processed in the link layer may be multicast as a broadcast signal through processes such as encoding, interleaving, modulation, and the like in a physical layer (ATSC 3.0 Physical Layer).

Meanwhile, in the case of a broadband protocol stack, service data formatted in the DASH segment format, signaling, NRT, and the like may be transmitted via Hypertext Transfer Protocol (HTTP). In this case, the service data, signaling, NRT, and the like may be processed through Transmission Control Protocol (TCP) and the IP layer, and then encapsulated through the link layer. The data processed in the link layer may be processed for transmission in the physical layer and then unicasted to broadband.

Meanwhile, signaling may include bootstrap signaling through SLT and Service Layer Signaling (SLS). The bootstrap signaling and SLT may include information needed to obtain the service in the broadcast receiver 100. Here, the SLS may mean signaling which provides information for discovery and acquisition of audio data and video data for the broadcast service, etc.

In the case of the link layer, an ALP (ATSC 3.0 Link layer Protocol) packet may be generated by inputting an IP packet. The link layer may transmit the ALP packet to the physical layer. However, the link layer does not use only IP packets including service data, signaling, ESG, and EAS as input.

The link layer may also use MPEG2-TS packets or generalized packetized data as input. In this case, signaling information required for controlling the link layer may also be transmitted to the physical layer in the form of the ALP packet.

The physical layer may process the ALP packet to generate a frame. The physical layer may convert the frame into a radio signal to transmit the converted radio signal. In this case, the physical layer may include at least one Physical Layer Pipe (PLP). Here, the PLP may represent a logical channel that carries a service(s), or a stream transmitted through this channel. The PLP may be referred to as data unit, data pipe, or the like.

Meanwhile, according to the ATSC 3.0 standard, the broadcast signal CA transmitted from the broadcast transmitter 50 may include time-interleaved data. Here, time interleaving may mean a function or a series of processes that shuffle the order of data sequences over time according to a particular period, so as to distribute bit errors over time in a wireless channel environment where burst errors frequently occur.

As for the time interleaving of the physical layer, three modes of time interleaving may be used to time-interleave data in the PLP. The three modes of the time interleaving may include: no time interleaving mode, which is a mode for performing no time interleaving; a CTI mode, which is a mode for performing convolutional time interleaving using a Convolutional Time Interleaver (CTI); and a HTI mode, which is a mode for performing hybrid time interleaving using a Hybrid Time Interleaver (HTI).

FIG. 3 is a diagram for explaining a frame structure defined in the ATSC 3.0 standard, according to an embodiment of the present disclosure.

Referring to FIG. 3, a frame may include a bootstrap 10, a preamble 20, and at least one subframe 30.

The bootstrap 10 may be located at the beginning of the frame. The bootstrap 10 may include system version information, emergency alert information, frame length information, bandwidth information, frame sample rate information, and a transmission parameter information for detection of L1-basic signaling located at a first part of the preamble 20.

The preamble 20 may be located after the bootstrap 10. The preamble 20 may include L1 basic signaling and L1 detail signaling. The L1 basic signaling may include information common to the entire frame, configuration information of a symbol carrying L1 detail signaling, and information about a first subframe 30-1, and the like. The L1 detail signaling may include configuration information for each subframe 30, configuration information for each PLP included in the subframe 30, and the like.

The subframe 30 may be located after the preamble 20. The subframe 20 may include at least one PLP. For example, when the broadcast transmitter 50 transmits two channels in a multi-channel format, the broadcast signal CA may be in the form of an M-PLP/Subframe where one frame 30 contains PLPs for respective channels, or in the form of a Multiple S-PLP/Subframe where two subframes 30 each contain one PLP for each channel.

Figure 4:
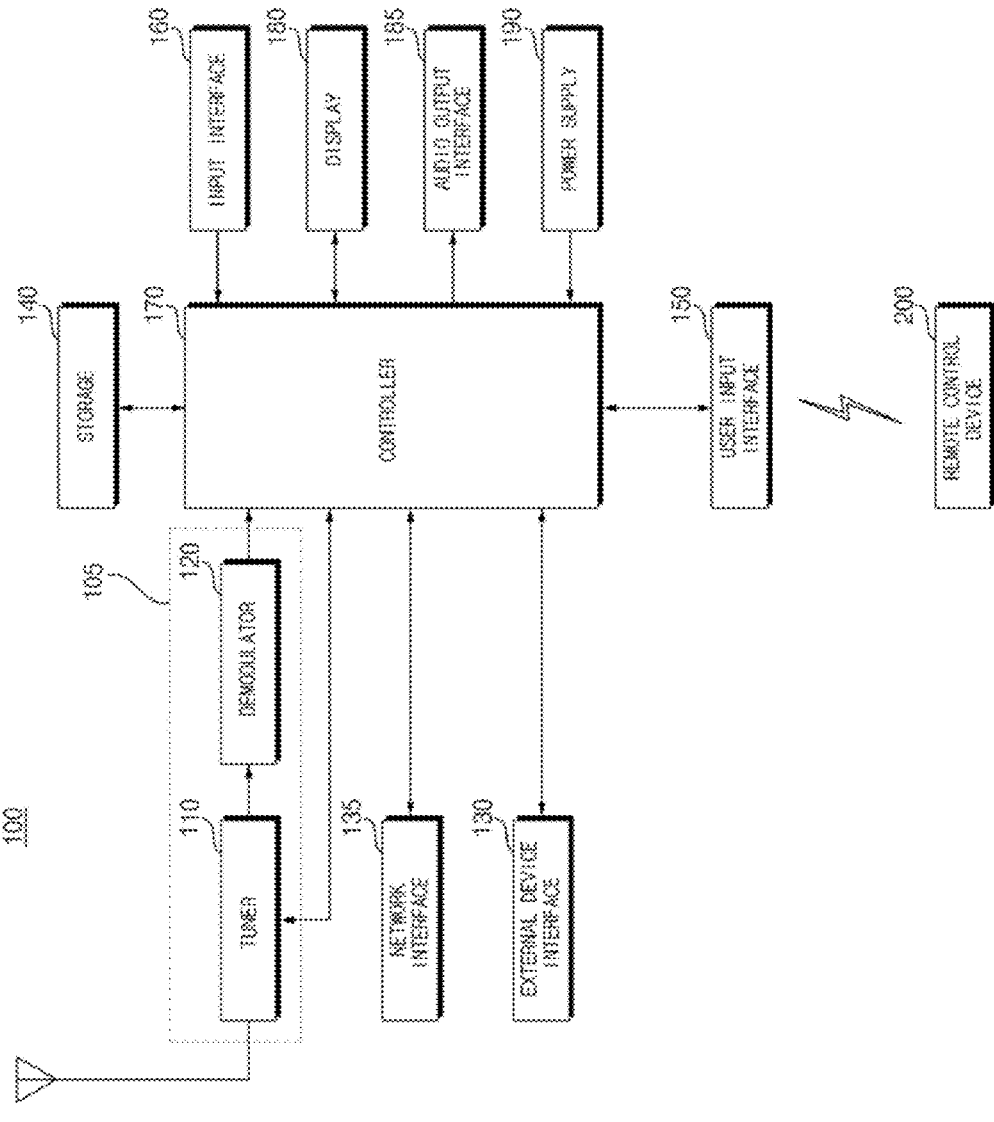
FIG. 4 is an internal block diagram of an image display apparatus according to an embodiment of the present disclosure.

FIG. 4 is an internal block diagram according to an image display apparatus according to an embodiment of the present disclosure.

Referring to FIG. 4, the image display apparatus 100 may include a broadcast receiver 105, an external device interface 130, a network interface 135, a storage 140, a user input interface 150, an input interface 160, a controller 170, a display 180, an audio output interface 185, and/or a power supply 190.

The broadcast receiver 105 may include a tuner 110 and a demodulator 120.

Meanwhile, unlike shown in FIG. 4, the image display apparatus 100 may include only the broadcast receiver 105 and the external device interface 130, among the broadcast receiver 105, the external device interface 130, and the network interface 135. That is, the image display apparatus 100 may not include the network interface 135.

The tuner 110 may select a broadcast signal corresponding to a channel selected by a user or each of all pre-stored channels from among broadcast signals received through an antenna (not shown) or a cable (not shown). The tuner 110 may convert the selected broadcast signal into an intermediate frequency signal or a baseband video or audio signal.

For example, when the selected broadcast signal is a digital broadcast signal, the tuner 10 may convert it into a digital IF (DIF) signal, whereas when the selected broadcast signal is an analog broadcast signal, the tuner 10 may convert it into an analog baseband video or audio signal (CVBS/SIF). That is, the tuner 110 may process the digital broadcast signal or the analog broadcast signal. The analog baseband video or audio signal (CVBS/SIF) output from the tuner 110 may be directly input to the controller 170.

Meanwhile, the tuner 110 may sequentially select broadcast signals corresponding to all broadcast channels stored through a channel memory function from among the received broadcast signals, and then may convert them into intermediate frequency signals or baseband video or audio signals.

Meanwhile, the tuner 110 may include a plurality of tuners to receive broadcast signals of a plurality of channels. Alternatively, the tuner 110 may be configured as a single tuner capable of simultaneously receiving broadcast signals of a plurality of channels.

The demodulator 120 may receive and demodulate the digital IF (DIF) signal converted by the tuner 100.

The demodulator 120 may performing demodulation and channel decoding to output a stream signal TS. Here, the stream signal TS may be a signal in which a video signal, an audio signal, and a data signal are multiplexed.

The stream signal output from the demodulator 120 may be input to the controller 170. The controller 170 may perform demultiplexing and video/audio signal processing, and then may output an image and sound through the display 180 and the audio output interface 185, respectively.

The external device interface 130 may transmit and receive data to and from an external device connected thereto. To this end, the external device interface 130 may include an A/V input and output interface (not shown).

The external device interface 130 may be connected to an external device such as a Digital Versatile Disc (DVD), a Blu-ray disc, a game console, a camera, a camcorder, a computer (e.g., a laptop computer), or a set-top box in a wired or wireless manner, and may perform input/output operations with the external device.

In addition, the external device interface 130 may establish a communication network with various remote control devices 200, so as to receive a control signal related to the operation of the image display apparatus 100 from the remote control device 200 or transmit data related to the operation of the image display apparatus 100 to the remote control device 200.

The A/V input and output interface may receive video and audio signals from an external device. For example, the A/V input and output interface may include an Ethernet terminal, a USB terminal, a Composite Video Banking Sync (CVBS) terminal, a component terminal, an S-video terminal (analog), a Digital Visual Interface (DVI) terminal, a High-Definition Multimedia Interface (HDMI) terminal, a Mobile High-definition Link (MHL) terminal, a RGB terminal, a D-SUB terminal, an IEEE 1394 terminal, an SPDIF terminal, a liquid HD terminal, etc. Digital signals input through these terminals may be transmitted to the controller 170. In this case, analog signals input through the CVBS terminal and the S-video terminal may be converted by an analog-digital converter (not shown) to be transmitted to the controller 170.

The external device interface 130 may include a wireless communication interface (not shown) for short-range wireless communication with another electronic device. The wireless communication interface may allow the external device interface 130 to exchange data with a mobile terminal nearby. For example, the external device interface 130 may receive device information, information about an application being executed, and an application image from the mobile terminal in a mirroring mode.

The external device interface 130 may use Bluetooth, Radio Frequency Identification (RFID), infrared Data Association (IrDA), Ultra-Wideband (UWB), ZigBee, or the like to perform short-range wireless communication.

The network interface 135 may provide an interface for connecting the image display apparatus 100 to a wired/wireless network including an internet network.

The network interface 135 may include a communication module (not shown) for connection to a wired/wireless network. For example, the network interface 135 may include a communication module for Wireless LAN (WLAN) (Wi-Fi), Wireless Broadband (WiBro), Worldwide Interoperability for Microwave Access (WiMAX), High Speed Downlink Packet Access (HSDPA), etc.

The network interface 135 may transmit or receive data with another user or another electronic device through a connected network or another network linked to the connected network.

The network interface 135 may receive web content or data provided by a content provider or a network operator. That is, the network interface 135 may receive, through a network, content such as movies, advertisements, games, VOD files, and broadcast signals provided by a content provider or a network operator, and information related thereto.

The network interface 135 may receive update information and update files of a firmware provided by a network operator, and may transmit data over Internet or to a content provider or a network provider.

The network interface 135 may select and receive, through a network, a desired application from among applications open to the public.

The storage 140 may store a program for processing and controlling each signal in the controller 170, or may store a signal-processed video, audio, or data signal. For example, the storage 140 may store applications designed to perform various tasks that can be processed by the controller 170, and may selectively provide some of the stored applications in response to a request from the controller 170.

The program stored in the storage 140 is not limited to any specific program, so long as it is capable of being executed by the controller 170.

The storage 140 may temporally store a video, audio, or data signal received from an external device through the external device interface 130.

The storage 140 may store information about predetermined broadcast channels through a channel memory function such as channel map.

Although FIG. 4 illustrates that the storage 140 is provided separately from the controller 170, the present disclosure is not limited thereto. The storage 140 may be included in the controller 170.

The storage 140 may include at least one of volatile memory (e.g., DRAM, SRAM, SDRAM, etc.) or non-volatile memory (e.g., flash memory, hard disk drive (HDD), solid-state drive (SSD), etc.). In various embodiments of the present disclosure, the storage 140 and the memory may be used interchangeably.

The user input interface 150 may deliver a signal input by a user to the controller 170 or may deliver a signal from the controller 170 to the user.

For example, the user input interface 150 may transmit/receive a user input signal, such as power on/off, channel selection, or screen setting, to/from the remote control device 200, may transmit a user input signal input through a local key (not shown), such as a power key, a channel key, a volume key, or a setting key, to the controller 170, may transmit a user input signal input from a sensor (not shown) configured to sense a user's gesture, or may transmit a signal from the controller 170 to the sensor.

The input interface 160 may be provided on one side of a body of the image display apparatus 100. For example, the input interface 160 may include a touch pad, a physical button, etc.

The input interface 160 may receive various user commands related to the operation of the image display apparatus 100, and may transmit a control signal corresponding to the received command to the controller 170.

The input interface 160 may include at least one microphone (not shown), and may receive a user's voice through the microphone.

The controller 170 may include at least one processor, and may control the overall operation of the image display apparatus 100 using the processor included therein. Here, the processor may be a general processor such as a central processing unit (CPU). Alternatively, the processor may be a dedicated device such as an application-specific integrated circuit (ASIC), or may be any of other hardware-based processors.

The controller 170 may demultiplex a stream input through the tuner 110, the demodulator 120, the external device interface 130, or the network interface 135, or may process demultiplexed signals to generate and output a signal for video or audio output.

The display 180 may convert an image signal, a data signal, an on-screen display (OSD) signal or a control signal processed by the controller 170, or an image signal, a data signal or a control signal received from the external device interface 130 to generate a driving signal.

The display 100 may include a display panel (not shown) including a plurality of pixels.

The plurality of pixels provided in the display panel may include RGB subpixels. Alternatively, the plurality of pixels provided in the display panel may include RGBW subpixels. The display 180 may convert an image signal, a data signal, an OSD signal or a control signal processed by the controller 170 to generate a signal for driving the plurality of pixels.

The display 180 may be implemented as a plasma display panel (PDP) display, a liquid crystal display (LCD) display, an organic light-emitting diode (OLED) display or a flexible display, or may be implemented as a three-dimensional (3D) display. The 3D display 180 may be classified as a non-glasses type and a glasses type.

Further, the display 180 may be configured as a touch screen, and thus may be used not only as an output device but also as an input device.

The audio output interface 185 may receive an audio signal processed by the controller 170 to output sound.

The image signal processed by the controller 170 may be input to the display 180, allowing an image corresponding to the received image signal to be displayed. In addition, the image signal processed by the controller 170 may be input to an external output device through the external device interface 130.

The audio signal processed by the controller 170 may be output in the form of sound through the audio output interface 185. In addition, the audio signal processed by the controller 170 may be input to the external output device through the external device interface 130.

Although not shown in FIG. 4, the controller 170 may include a demultiplexer and an image processing unit. This will be described later with reference to FIG. 5.

The controller 170 may control the overall operation of the image display apparatus 100. For example, the controller 170 may control the tuner 110 to tune a broadcast signal corresponding to a channel selected by a user or a pre-stored channel.

In addition, the controller 170 may control the image display apparatus 100 in response to a command input by the user through the user input interface 150 or according to an internal program.

The controller 170 may control the display 180 to display an image. Here, the image displayed on the display 180 may be a still image or a video, and may be a 2D image or a 3D image.

The controller 170 may control such that a predetermined 2D object is displayed in the image displayed on the display 180. For example, the object may be at least one of a connected web screen (e.g., newspaper or magazine), an electronic program guide (EPG), various menus, a widget, an icon, a still image, a video, and a text.

Meanwhile, the image display apparatus 100 may further include a photographing unit (not shown). The photographing unit may photograph a user. The photographing unit may be configured as one camera, but is not limited thereto. The photographing unit may be configured as a plurality of cameras. The photographing unit may be embedded in the image display apparatus 100 at an upper portion of the display 180 or may be separately disposed. Information of an image captured by the photographing unit may be input to the controller 170.

The controller 170 may identify the location of a user based on an image captured by the photographing unit. For example, the controller 170 may identify a distance (z-axis coordinate) between the user and the image display apparatus 100. In addition, the controller 170 may determine the x-axis coordinate and the y-axis coordinate in the display 180 that correspond to the location of the user.

The controller 170 detect a user's gesture based on an image captured by the photographing unit, each of signals sensed by the sensor, or a combination thereof.

The power supply 190 may supply corresponding power throughout the image display apparatus 100. In particular, the power supply 190 may supply power to the controller 170, which can be implemented in the form of a system-on-chip (SOC), the display 180 for displaying an image, and the audio output interface 185 for audio output.

Specifically, the power supply 190 may include a converter (not shown) for converting alternating-current (AC)

power to direct-current (DC) power, and a DC/DC converter (not shown) for converting the level of DC power.

The remote control device 200 may transmit a user input to the user input interface 150. To this end, the remote control device 200 may use Bluetooth, Radio Frequency (RF) communication, Infrared Radiation (IR) communication, Ultra-Wideband (UWB), ZigBee, or the like. In addition, the remote control device 200 may receive a video, audio, or data signal output from the user input interface 150, and may output the received signal in the form of an image or sound.

The image display apparatus 100 described above may be a digital broadcast receiver capable of receiving a fixed or mobile digital broadcast.

Meanwhile, the block diagram of the image display apparatus 100 shown in FIG. 4 is merely one example of the present disclosure. The respective components of the block diagram may be combined, added, or omitted depending on the specification of an image display apparatus 100 that is actually implemented.

In other words, two or more components may be combined into a single component, or one component may be subdivided into two or more components as necessary. In addition, the function performed in each block is merely illustrative, and a specific operation or configuration thereof does not limit the scope of the present disclosure.

Figure 5:
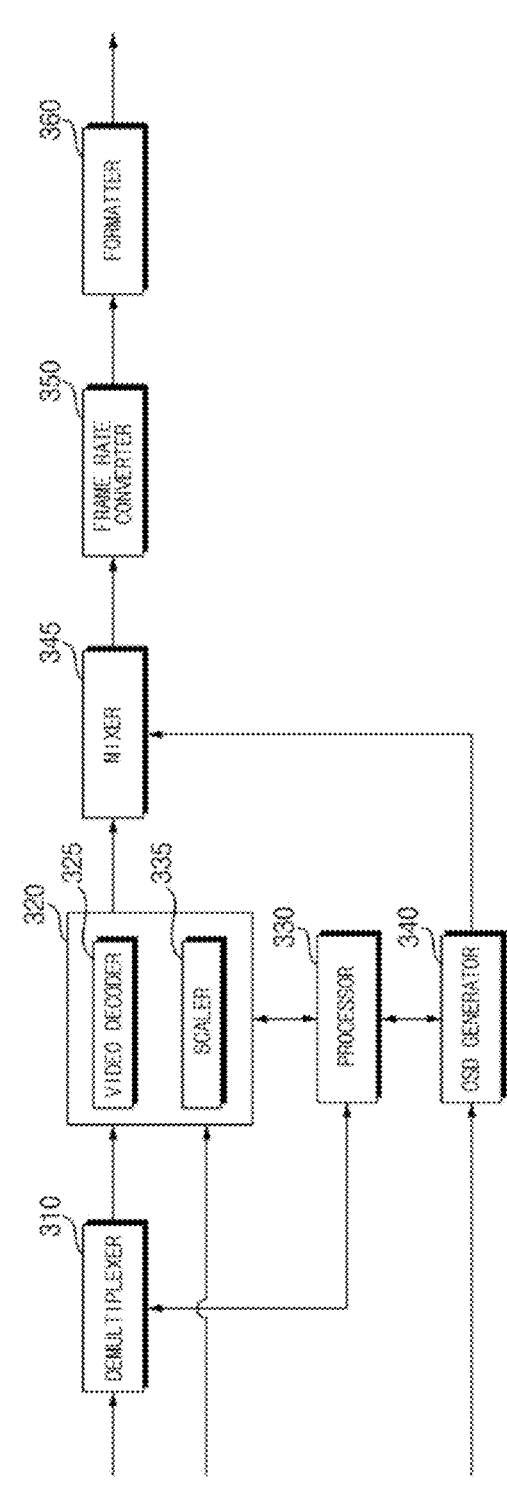
FIG. 5 is a diagram for explaining a controller of FIG. 4.

FIG. 5 is an internal block diagram of a controller of FIG. 4.

Referring to FIG. 5, the controller 170 according to an embodiment of the present disclosure may include a demultiplexer 310, an image processing unit 320, a processor 330, an OSD generator 340, a mixer 345, a frame rate converter 350, and/or a formatter 360. The controller 170 may further include an audio processing unit (not shown) and a data processing unit (not shown).

The demultiplexer 310 may demultiplex an input stream. For example, the demultiplexer 310 may demultiplex an MPEG-2 TS into an image signal, an audio signal, and a data signal. Here, the stream signal input to the demultiplexer 310 may be a stream signal output from the tuner 110, the demodulator 120, or the external device interface 130.

The image processing unit 320 may perform image processing on the demultiplexed image signal. To this end, the image processing unit 320 may include a video decoder 325 and a scaler 335.

The video decoder 325 may decode the demultiplexed image signal, and the scaler 335 may perform scaling to allow the resolution of the decoded image signal to be displayed on the display 180.

The video decoder 325 may include decoders of different standards. For example, the video decoder 325 may include an MPEG-2 decoder, an H.264 decoder, a 3D video decoder for a color image and a depth image, a decoder for multi-view images, and the like.

The processor 330 may control the overall operation of the image display apparatus 100 or the controller 170. For example, the processor 330 may control the tuner 110 to tune a broadcast corresponding to a channel selected by a user or a pre-stored channel.

In addition, the processor 330 may control the image display apparatus 100 according to a user command input through the user input interface 150 or according to an internal program.

In addition, the processor 330 may control data transmission with the network interface 135 or the external device interface 130.

Further, the processor 330 may control the operation of the demultiplexer 310, the image processing unit 320, the OSD generator 340 in the controller 170.

The OSD generator 340 may generate an OSD signal autonomously or according to a user input. For example, the OSD generator 340 may generate a signal for displaying various kinds of information in the form of a graphic image or a text on the screen of the display 180, based on a user input signal input through the input interface 160.

The generated OSD signal may include various data such as a user interface screen of the image display apparatus 100, various menu screens, widgets, icons, and the like. In addition, the generated OSD signal may include a 2D object or a 3D object.

In addition, the OSD generator 340 may generate a pointer that can be displayed on the display 180 based on a pointing signal received from the remote control device 200.

The OSD generator 340 may include a pointing signal processing unit (not shown) to generate a pointer. The pointing signal processing unit (not shown) may be provided separately instead of being provided in the OSD generator 340.

The mixer 345 may mix the OSD signal generated by the OSD generator 340 and the decoded image signal processed by the image processing unit 320. The mixed image signal may be provided to the frame rate converter 350.

The frame rate converter (FRC) 350 may convert the frame rate of an input image. Alternatively, the FRC 350 may output an input image without any frame rate conversion.

The formatter 360 may arrange a left-eye image frame and a right-eye image frame of the frame rate converted 3D image. The formatter 360 may output a synchronization signal Vsync to open the left eye glass or right eye glass of a 3D viewing device (not shown).

Meanwhile, the formatter 360 may change the format of an input image signal to an image signal suitable for being displayed on the display 180.

In addition, the formatter 360 may change the format of a 3D image signal. For example, the formatter 360 may change the format of a 3D image signal to one of various 3D formats such as a side-by-side format, a top/down format, a frame sequential format, an interlaced format, a checker box format.

Meanwhile, the formatter 360 may convert a 2D image signal into a 3D image signal. For example, according to a 3D image generation algorithm, the formatter 360 may detect an edge or a selectable object in a 2D image signal, and separate an object defined by the detected edge or the selectable object into a 3D image signal. Here, the generated 3D image signal may be separated into a left-eye image signal L and a right-eye image signal R to be aligned.

Although not shown in the drawing, a 3D processor (not shown) for processing a 3-dimensional (3D) effect signal may be further provided after the formatter 360. Such a 3D processor may perform brightness, tint, and color adjustment to improve 3D effects. For example, the 3D processor may perform signal processing to make the near clear and the far blurry. Meanwhile, the function of the 3D processor may be integrated into the formatter 360 or the image processing unit 320.

Meanwhile, the audio processing unit (not shown) in the controller 170 may process a demultiplexed audio signal. To this end, the audio processing unit (not shown) may include various decoders.

The audio processing unit (not shown) in the controller 170 may perform bass, treble, and volume adjustment.

The data processing unit (not shown) in the controller 170 may perform data processing on a demultiplexed data signal. For example, when the demultiplexed data signal is an encoded data signal, the data processing unit may decode it. The encoded data signal may be electronic program guide (EPG) information including broadcasting information such as the start time and end time of broadcast programs aired on each channel.

Meanwhile, the block diagram of the controller 170 shown in FIG. 5 is merely one example of the present disclosure. The respective components of the block diagram may be combined, added, or omitted depending on the specification of a controller 170 that is actually implemented.

In particular, the frame rate converter 350 and the formatter 360 may not be provided in the controller 170 and may be respectively provided separately from the controller 170, or may be provided as a single module separately from the controller 170.

Figure 6:
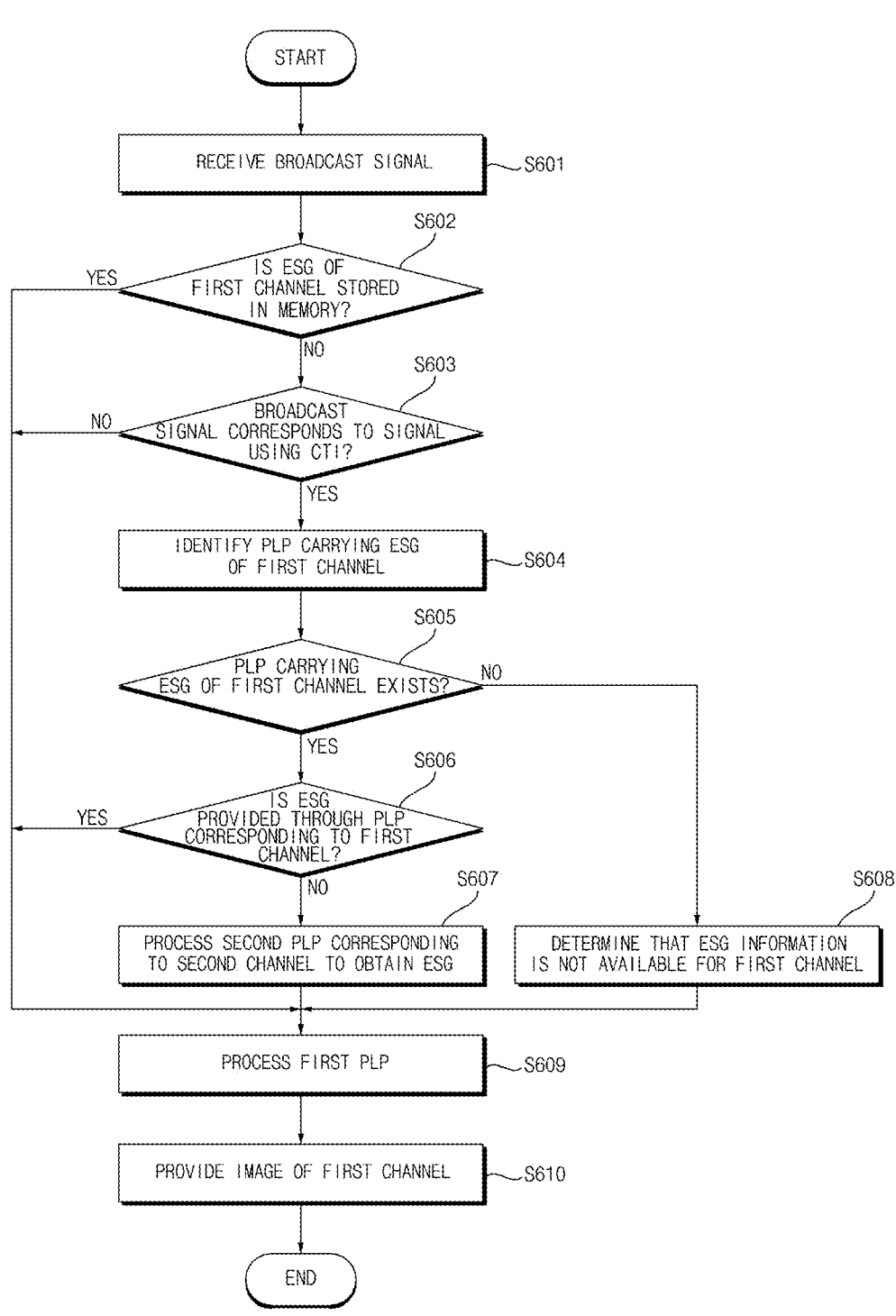
FIG. 6 is a flowchart illustrating a method of operating a signal processing device according to an embodiment of the present disclosure.

FIG. 6 is a flowchart illustrating a method of operating a signal processing device according to an embodiment of the present disclosure.

Referring to FIG. 6, in operation S601, the signal processing device 100a may receive a broadcast signal. The signal processing device 100a may receive a broadcast signal consisting of a plurality of PLPs corresponding to a plurality of channels through a tuner included in a broadcast receiver 105. For example, the broadcast signal may include a first subframe 30-1 including a first PLP corresponding to a first channel, and a second subframe 30-2 including a second PLP corresponding to a second channel. Hereinafter, a description will be given of a function (or operation) of providing a broadcast service based on an example in which the signal processing device 100a receives a broadcast signal for the first channel while a broadcast channel is set to the first channel.

In one implementation, the signal processing device 100a may receive the broadcast signal when the power is turned on from off so that the operation of providing the broadcast service is initiated. In one implementation, the signal processing device 100a may receive the broadcast signal when the broadcast channel is switched to the first channel while performing the operation of providing the broadcast service. In one implementation, the signal processing device 100a may receive the broadcast signal when the operation of providing the broadcast service is performed in a background environment. In one implementation, the signal processing device 100a may receive the broadcast signal when switching to the operation of providing the broadcast service from an operation different from the operation of providing the broadcast service such as an operation of providing content received via HDMI, an operation of providing a web service over a network, or the like.

In operation S602, the signal processing device 100a may determine whether program information about the first channel, which is a preset broadcast channel, is stored in a memory 140. The program information may include at least an electronic service guide (ESG).

In operation S603, when the program information about the first channel is not stored in the memory 140, the signal processing device 100a may determine whether the received broadcast signal is a signal using a convolutional time interleaver (CTI). For example, L1 detail signaling included in a preamble 20 of the broadcast signal may include information about the mode of time interleaving. In this case, based on the information about the mode of time interleaving included in the preamble 20, the signal processing device 100a may determine whether the broadcast signal is a signal using the CTI.

When the broadcast signal is a signal using the CTI, the signal processing device 100a may not be able to simultaneously process the first PLP corresponding to the first channel and the second PLP corresponding to the second channel. By contrast, when the broadcast signal is not a signal using the CTI, such as a signal using a hybrid time interleaver (HTI), the signal processing device 100a may simultaneously process the first PLP corresponding to the first channel and the second PLP corresponding to the second channel. Here, processing on the PLPs may include performing de-interleaving and decoding on the PLPs. The signal processing device 100a may include a deinterleaver (not shown) to perform deinterleaving. The deinterleaver may be included in a controller 170 of the signal processing device 100a. For example, when the broadcast channel is set to the first channel, the signal processing device 100a may deinterleave the first PLP corresponding to the first channel. Based on the deinterleaved signal, the signal processing device 100a may generate an image signal for the first channel.

In operation S604, when the broadcast signal is a signal using the CTI, the signal processing device 100a may identify, among the plurality of PLPs, a PLP carrying program information about the first channel. For example, L1 detail signaling included in the preamble 20 of the broadcast signal may include information about the PLP carrying program information for each channel. Based on the L1 detail signaling included in the preamble 20 of the broadcast signal, the signal processing device 100a may determine a PLP carrying program information about the first channel.

In operation S605, the signal processing device 100a may determine the absence or presence of a PLP carrying program information about the first channel. For example, when all of the plurality of PLPs included in the broadcast signal do not provide program information for the first channel, the signal processing device 100a may determine that there is no PLP carrying program information about the first channel.

In operation S606, in the presence of a PLP carrying program information about the first channel, the signal processing device 100a may determine whether the program information about the first channel is provided through the first PLP.

In operation S607, when the program information about the first channel is provided through the second PLP corresponding to the second channel, not through the first PLP, the signal processing device 100a may process the second PLP to obtain the program information about the first channel. Herein, a description will be given based on an example in which program information about the first channel is provided through the second PLP when the program information about the first channel is not provided through the first PLP. The signal processing device 100a may store the obtained program information about the first channel in the memory 140. Meanwhile, when program information about each of the plurality of channels including the first channel is obtained through the second PLP, the signal processing device 100a may store all of the obtained program information in the memory 140.

Meanwhile, in operation S608, in the absence of a PLP carrying program information about the first channel, the signal processing device 100a may determine that program information is not available for the first channel. In one implementation, in the absence of a PLP carrying program information about the first channel, the signal processing device 100a may store, in the memory 140, a history indicating that program information is not available for the first channel.

In one implementation, in a case where the second PLP is determined as a PLP carrying program information about the first channel based on the preamble 20 of the broadcast signal, the signal processing device 100a may determine that program information is not available for the first channel when the program information about the first channel is not provided through the second PLP as a result of processing the second PLP. When program information is not available for the first channel as a result of processing the second PLP, signal processing device 100a may store, in the memory 140, a history indicating that program information is not available for the first channel.

In operation S609, the signal processing device 100a may process the first PLP. For example, the signal processing device 100a may process the first PLP to generate an image signal for the first channel.

When program information about the first channel is provided through the first PLP, the signal processing device 100a may process the first PLP to obtain the program information about the first channel.

When program information about the first channel is stored in the memory 140, the signal processing device 100a may process the first PLP. For example, the signal processing device 100a may process the first PLP to generate an image signal for the first channel.

When program information about the first channel is not stored in the memory 140 and the received broadcast signal is not a signal using the CTI, the signal processing device 100a may process the first PLP. For example, when the received broadcast signal is a signal using a hybrid time interleaver (HTI), the signal processing device 100a may simultaneously process the first PLP and the second PLP. Here, by processing the first PLP and the second PLP at the same time, the signal processing device 100a may obtain the program information about the first channel through any one of the first PLP or the second PLP.

When a history indicating that program information is not available for the first channel is stored in the memory 140, the signal processing device 100a may process the first PLP. For example, the signal processing device 100a may skip an operation associated with obtaining program information about the first channel when the history indicating that program information is not available for the first channel is stored in the memory 140.

In operation S610, the signal processing device 100a may provide an image (or content) of the first channel. Here, when program information about the first channel is obtained, the signal processing device 100a may provide the program information about the first channel along with the image of the first channel. For example, when the signal processing device 100a is provided in an image display apparatus including a display 180, the image display apparatus may output, via the display 180, both an image of the first channel and program information about the first channel. For example, the signal processing device 100a may transmit both an image signal for the first channel and program information about the first channel to an image display apparatus such as a monitor or the like.

Figure 7:
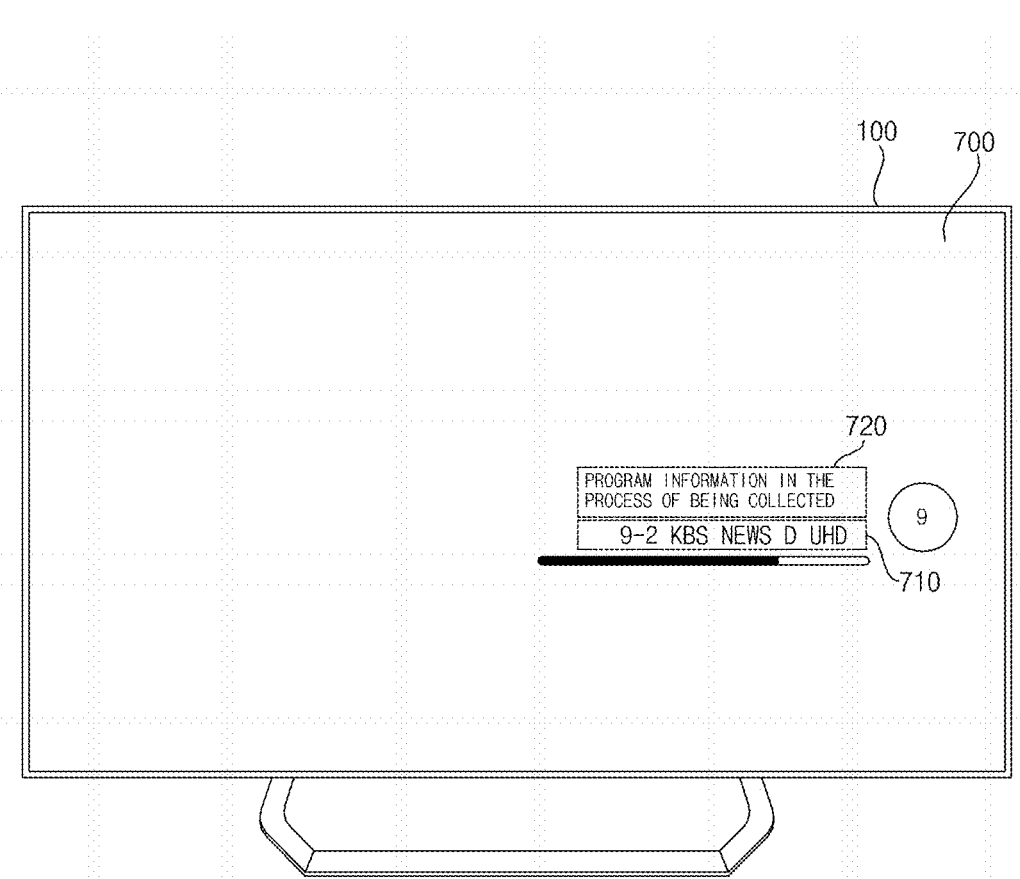
FIGS. 7 to 15 are diagrams for explaining the operation of an image display apparatus according to an embodiment of the preset disclosure.

Referring to FIG. 7, when the image display apparatus 100 is powered on from off state to initiate an operation of providing a broadcast service, the image display apparatus 100 may receive and process a broadcast signal. In this case, when a broadcast channel is set to Channel 9-2, the image display apparatus 100 may process a first PLP corresponding to Channel 9-2. The image display apparatus 100 may output a standby screen 700 while processing the first PLP corresponding to Channel 9-2. The standby screen 700 may include an object 710 indicating a preset broadcast channel.

Meanwhile, when program information about Channel 9-2 is not stored in the memory 140 of the image display apparatus 100, the standby screen 700 may include an object 720 indicating that an operation of obtaining program information for Channel 9-2 is performing.

When program information about Channel 9-2 is included in the broadcast signal, the image display apparatus 100 may obtain the program information about Channel 9-2 acquired from the broadcast signal. For example, when program information about Channel 9-2 is included in the first PLP corresponding to Channel 9-2, the image display apparatus 100 may process the first PLP to obtain the program information about Channel 9-2. For example, when program information about Channel 9-2 is included in a second PLP corresponding to Channel 9-1, the image display apparatus 100 may process the second PLP corresponding to Channel 9-1 to obtain the program information about Channel 9-2, and then may process the first PLP corresponding to Channel 9-2 to provide an image (or content) of Channel 9-2.

Figure 8:
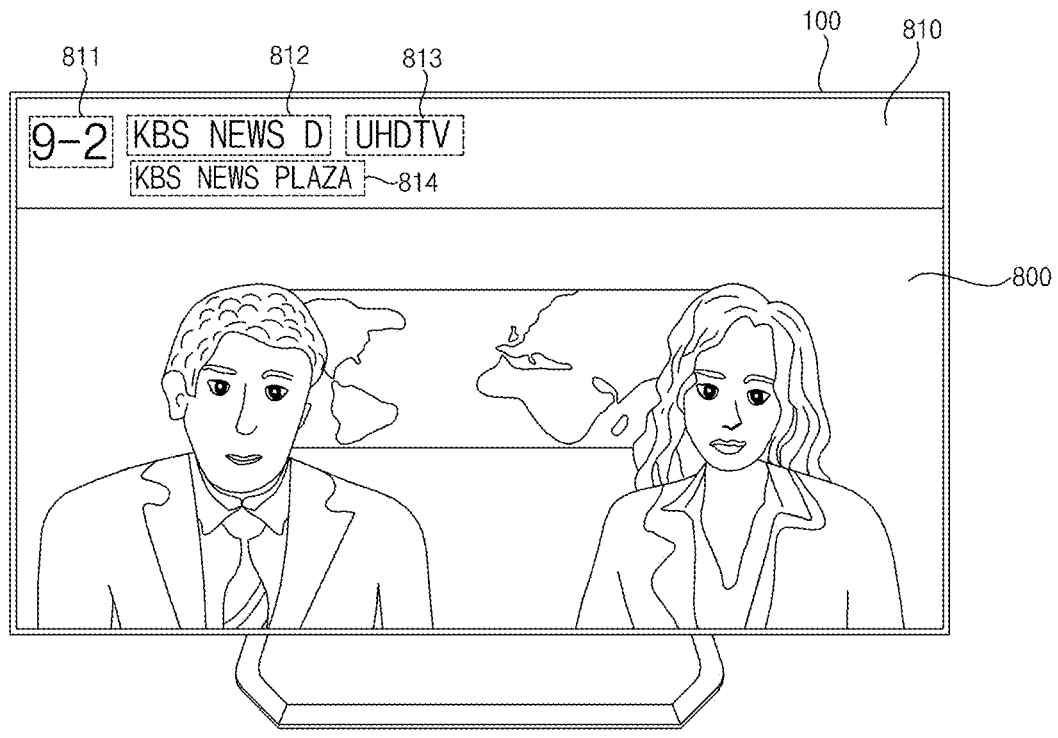

Referring to FIG. 8, the image display apparatus 100 may output, via the display 180, an image 800 of Channel 9-2. In this case, the image display apparatus 100 may output objects 811 to 814 in association with the broadcast channel in a predetermined area 810 of the display 180. For example, the image display apparatus 100 may display, in the predetermined area 810 of the display 180a, a channel number object 811 indicating a channel number of the current broadcast channel (i.e., Channel 9-2), a channel name object 812 indicating the name of the current broadcast channel (i.e., Channel 9-2), a resolution object 813 indicating the resolution of the current broadcast channel (i.e., Channel 9-2), and the like.

Based on the program information about Channel 9-2 being obtained from the broadcast signal, the image display apparatus 100 may output, in the predetermined area 810 of the display 180, a program title object 814 indicating the title of a broadcast program currently being aired on Channel 9-2.

Figure 9:
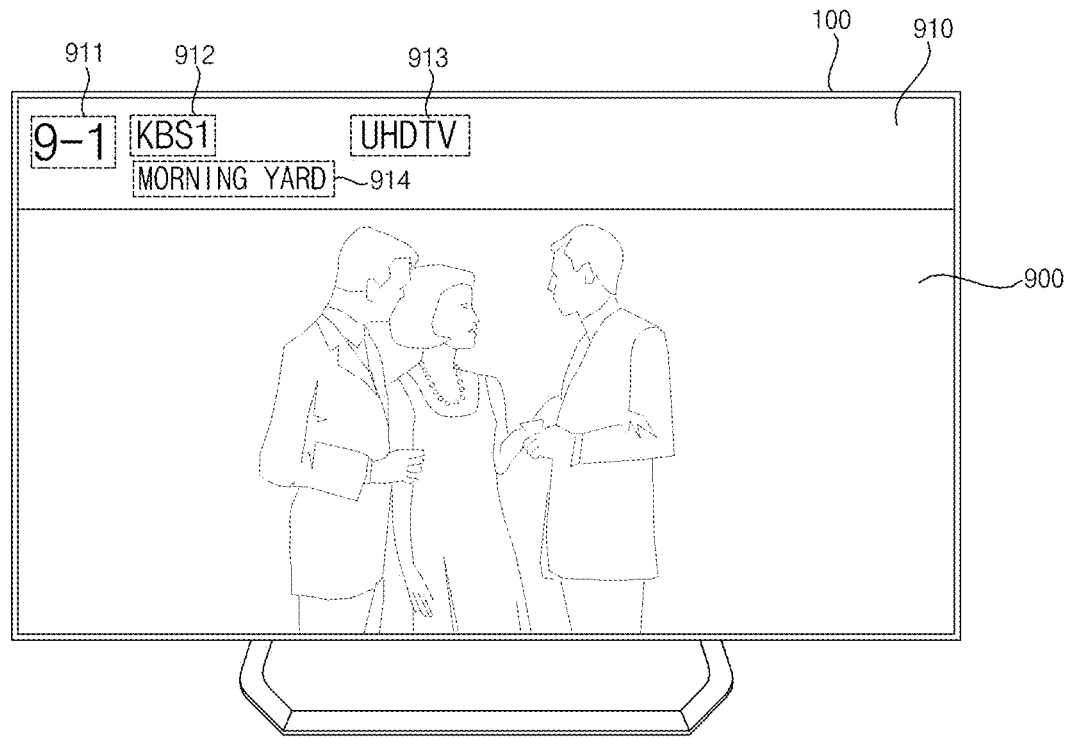

Referring to FIG. 9, the image display apparatus 100 may output, via the display 180, an image 900 of Channel 9-1 set to a broadcast channel. The image display apparatus 100 may display, in a predetermined area 910 of the display 180, a channel number object 911 indicating a channel number of the current broadcast channel (i.e., Channel 9-1), a channel name object 912 indicating the name of the current broadcast channel (i.e., Channel 9-1), a resolution object 913 indicating the resolution of the current broadcast channel (i.e., Channel 9-1), and a program title object 914 indicating the title of a broadcast program currently being aired on Channel 9-1.

Meanwhile, the broadcast signal received by the image display apparatus 100 may include a second PLP corresponding to Channel 9-1, which is the currently tuned broadcast channel, and a first PLP corresponding to Channel 9-2. The image display apparatus 100 may process the second PLP corresponding to Channel 9-1 so as to provide an image of Channel 9-1. In addition, both program information about Channel 9-1 and program information about Channel 9-2 may be provided through the second PLP corresponding to Channel 9-1. In this case, the image display apparatus 100 may process the second PLP corresponding to Channel 9-1 to obtain both the program information for Channel 9-1 and the program information for Channel 9-2. The image display apparatus 100 may store the program information about Channel 9-1 and the program information about Channel 9-2 in the memory 140.

Figure 10:
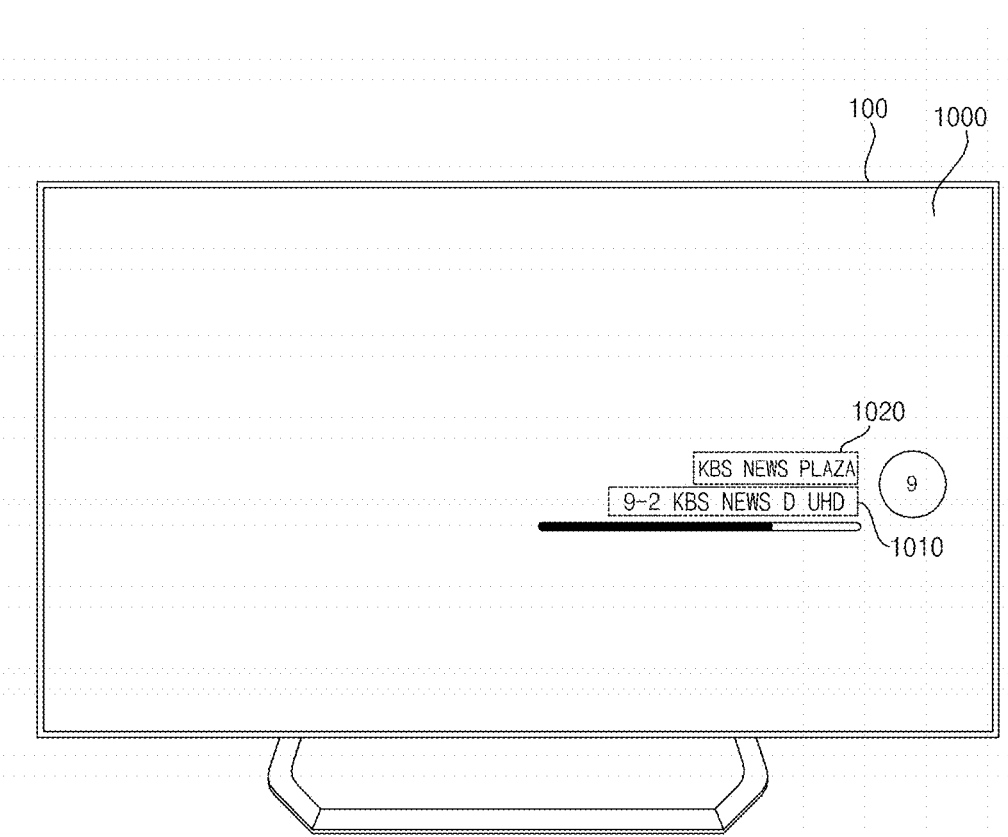

Referring to FIG. 10, when the broadcast channel is switched from Channel 9-1 to Channel 9-2, the image display apparatus 100 may determine whether program information about Channel 9-2 is stored in the memory 140. Based on the program information about Channel 9-2 being stored in the memory 140, the image display apparatus 100 may process the first PLP corresponding to Channel 9-2 to provide an image of channel 9-2.

The image display device 100 may output a standby screen 1000 while processing the first PLP corresponding to Channel 9-2. The standby screen 1000 may include a first object 1010 indicating a broadcast channel to be tuned to.

Meanwhile, based on program information about Channel 9-2 being stored in the memory 140 of the image display apparatus 100, the standby screen 1000 may include a program title object 1020 indicating the title of a broadcast program currently being aired on Channel 9-2.

Figure 11:
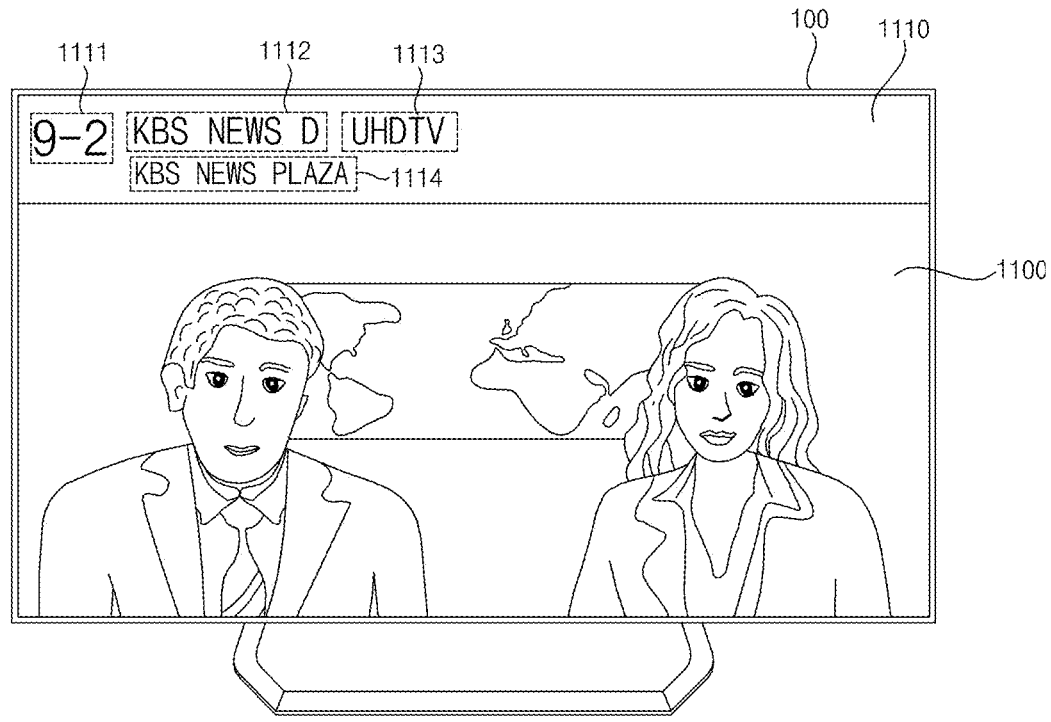

Referring to FIG. 11, the image display apparatus 100 may output, via the display 180, an image 1100 of Channel 9-2. In this case, the image display apparatus 100 may output objects 1111 to 1114 in association with the broadcast channel in a predetermined area 1100 of the display 180. For example, the image display apparatus 100 may display, in the predetermined area 1100 of the display 180, a channel number object 1111 indicating a channel number of the current broadcast channel (i.e., Channel 9-2), a channel name object 1112 indicating the name of the current broadcast channel (i.e., Channel 9-2), a resolution object 1113 indicating the resolution of the current broadcast channel (i.e., Channel 9-2), and a program title object 1114 indicating the title of a broadcast program currently being aired on Channel 9-2.

Figure 12:
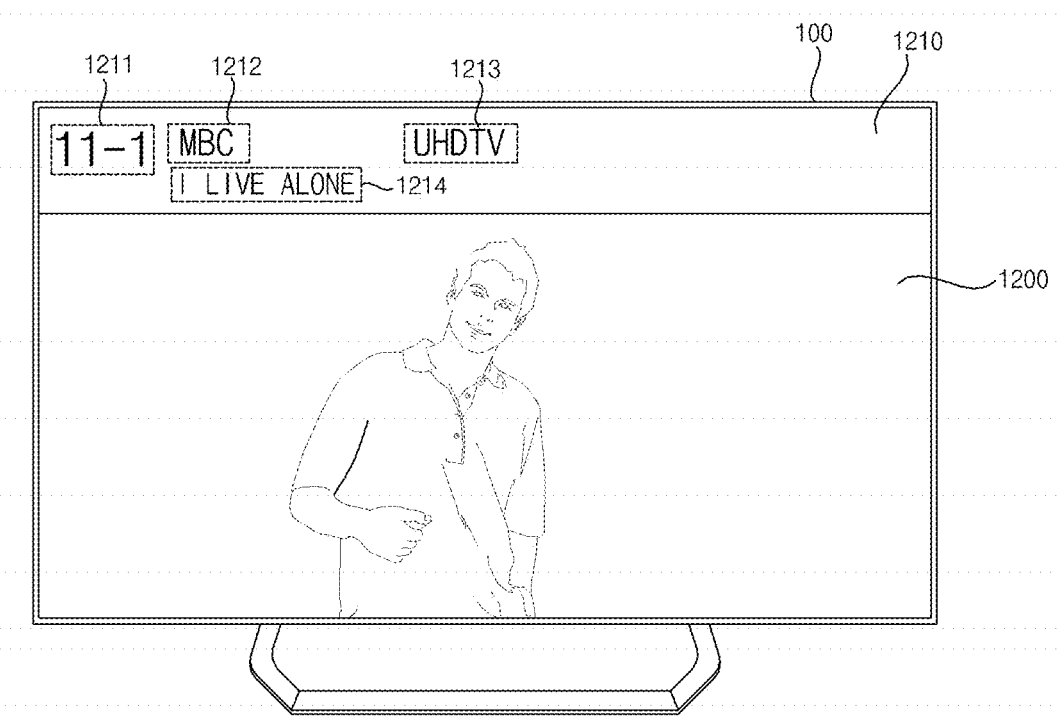

Referring to FIG. 12, the image display apparatus 100 may display, via the display 180, an image 1200 of Channel 11-1 set to a broadcast channel. In this case, the image display apparatus 100 may receive a broadcast signal including a third PLP corresponding to channel 11-1, without including a first PLP corresponding to Channel 9-2.

The image display apparatus 100 may output, in a predetermined area 1210 of the display 180, a channel number object 1211 indicating a channel number of the current broadcast channel (i.e., Channel 11-1), a channel name object 1211 indicating the name of the current broadcast channel (i.e., Channel 11-1), a resolution object 1213 indicating the resolution of the current broadcast channel (i.e., Channel 11-1), and a program title object 1214 indicating the title of a broadcast program currently being aired on Channel 11-1.

Figure 13:
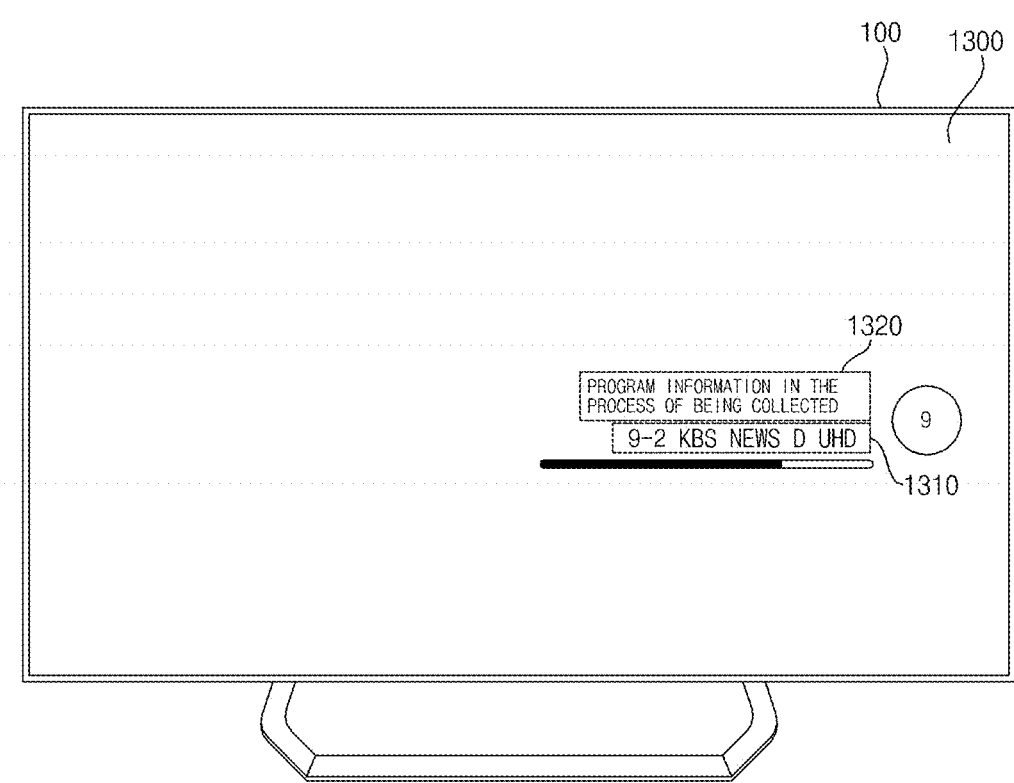

Referring to FIG. 13, when the broadcast channel is switched from Channel 11-1 to Channel 9-2, the image display apparatus 100 may determine whether program information about Channel 9-2 is stored in the memory 14. Based on the program information about Channel 9-2 not being stored in the memory 140, the image display apparatus 100 may process the first PLP corresponding to Channel 9-2 so as to provide an image of Channel 9-2. The image display apparatus 100 may output a standby screen 1300 while processing the first PLP corresponding to Channel 9-2. The standby screen 1300 may include an object 1310 indicating a preset broadcast channel.

Meanwhile, based on the program information about Channel 9-2 not being stored in the memory 140 of the image display apparatus 100, the standby screen 1300 may include an object 1320 indicating that an operation of obtaining program information for Channel 9-2 is performing.

Figure 14:
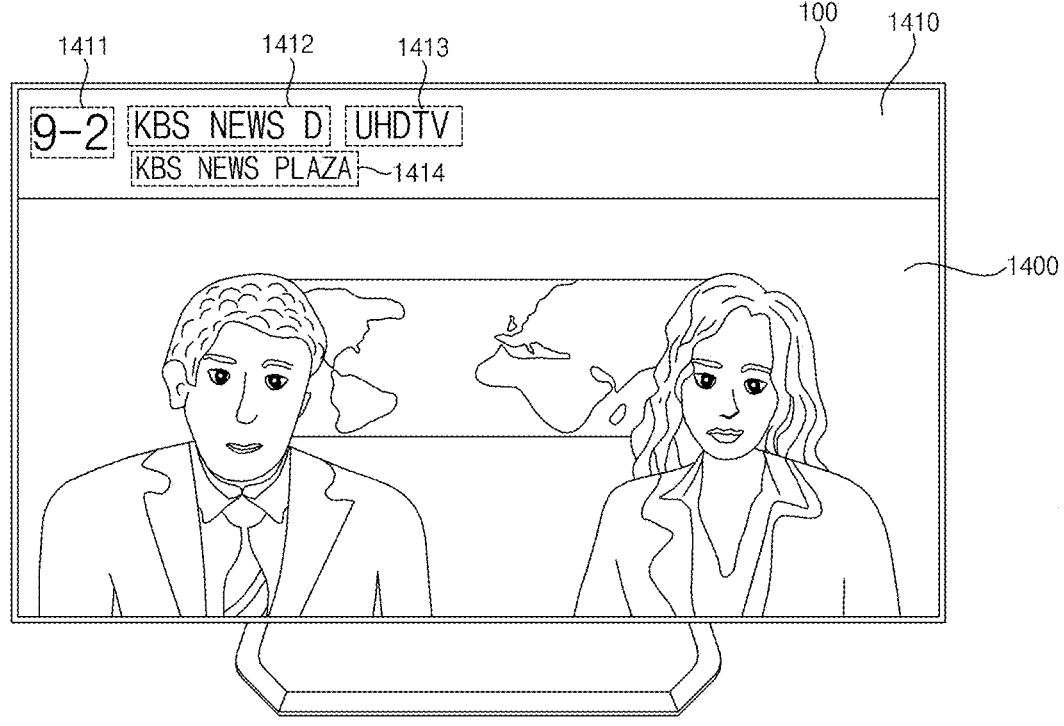

Referring to FIG. 14, the image display apparatus 100 may output, via the display 180, an image 1400 of Channel 9-2. In this case, the image display apparatus 100 may output objects 1411 to 1414 in association with the broadcast channel in a predetermined area 1410 of the display 180. For example, the image display apparatus 100 may display, in the predetermined area 1410 of the display 180, a channel number object 1411 indicating a channel number of the current broadcast channel (i.e., Channel 9-2), a channel name object 1412 indicating the name of the current broadcast channel (i.e., Channel 9-2), a resolution object 1413 indicating the resolution of the current broadcast channel (i.e., Channel 9-2), and a program title object indicating the title of a broadcast program currently being aired on Channel 9-2.

Figure 15:
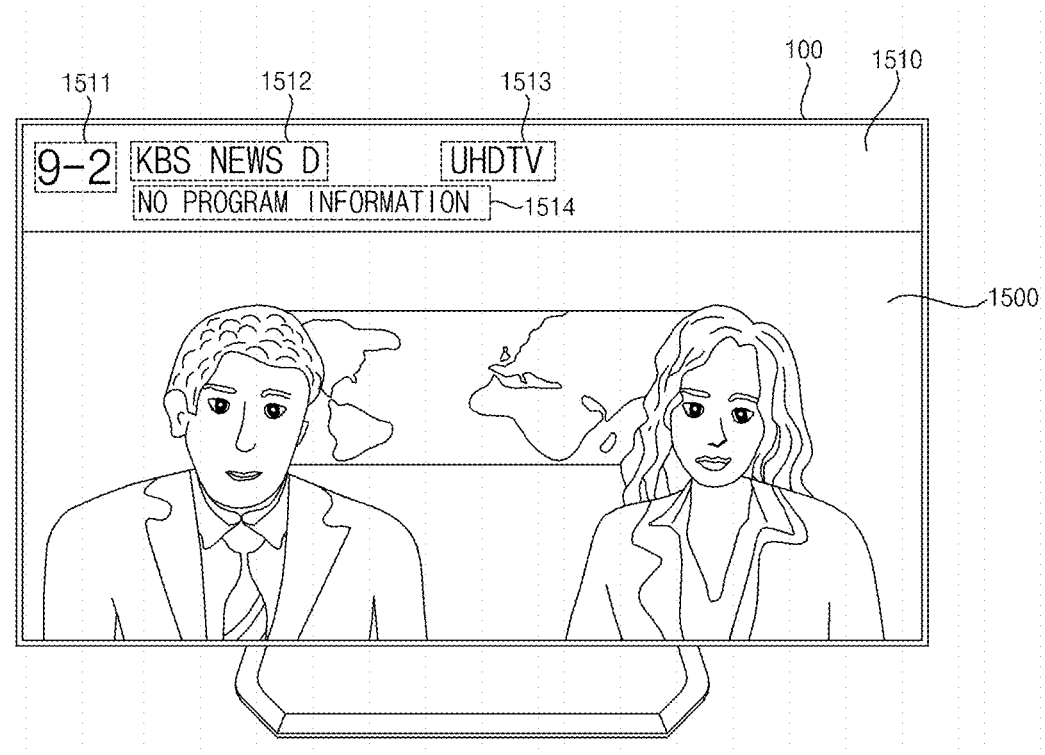

Meanwhile, referring to FIG. 15, the image display apparatus 100 may output, via the display 180, an image 1500 of Channel 9-2. The image display apparatus 100 may display objects 1511 to 1513 in association with the broadcast channel in a predetermined area 1510 of the display 180.

Meanwhile, when the broadcast signal received by the image display apparatus 100 does not contain channel information about Channel 9-2, the image display apparatus 100 may display, in the predetermined area 1510 of the display 180, an object 1514 indicating that program information is not available for Channel 9-2.

Figure 16:
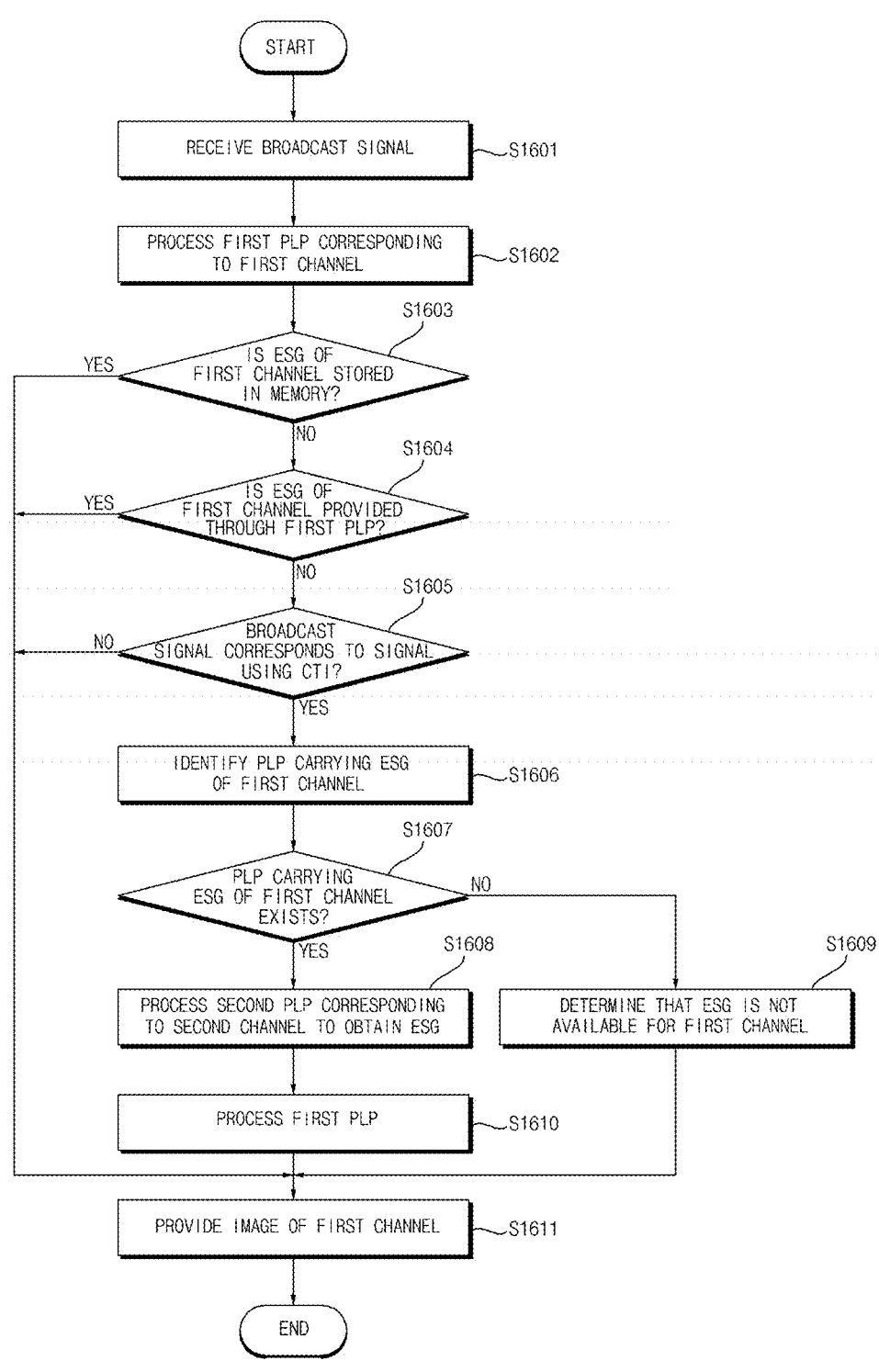
FIG. 16 is a flowchart for illustrating a method of operating a signal processing device according to an embodiment of the present disclosure.

FIG. 16 is a flowchart illustrating a method of operating a signal processing device according to an embodiment of the present disclosure. A detailed description the same as the description with reference to FIGS. 6 to 15 will be omitted.

Referring to FIG. 16, in operation S1601, the signal processing device 100a may receive a broadcast signal. For example, the broadcast signal may include a first subframe 30-1 including a first PLP corresponding to a first channel and a second subframe 30-2 including a second PLP corresponding to a second channel.

In operation S1602, the signal processing device 100a may process the first PLP corresponding to the first channel, which is a preset broadcast channel.

In operation S1603, the signal processing device 100a may determine whether program information about the first channel is stored in a memory 140. The program information may include at least an electronic service guide (ESG).

In operation S1604, when the program information about the first channel is not stored in the memory 140, the signal processing device 100a may determine, based on the result of processing the first PLP, whether the program information about the first channel is provided through the first PLP.

In operation S1605, when the program information about the first channel is not provided through the first PLP, the signal processing device 100a may determine whether the broadcast signal is a signal using a convolution time interleaver (CTI).

In operation S1606, when the broadcast signal is a signal using the CTI, the signal processing device 100a may determine, from among the plurality of PLPs, a PLP carrying program information for the first channel. For example, based on L1 detail signaling included in a preamble 20 of the broadcast signal, the signal processing device 100a may determine a PLP carrying the program information about the first channel.

In operation S1607, the signal processing device 100a may determine the absence or presence of a PLP carrying program information about the first channel.

In operation S1608, when the program information about the first channel is provided through the second PLP corresponding to the second channel, not through the first PLP, the signal processing device 100a may process the second PLP to obtain the program information about the first channel.

Meanwhile, in operation S1609, in the absence of a PLP carrying program information about the first channel, the signal processing device 100a may determine that program information is not available for the first channel.

In operation S1610, the signal processing device 100a may process the first PLP. For example, the signal processing device 100a may process the first PLP to generate an image signal for the first channel.

In operation S1611, the signal processing device 100a may provide an image (or content) of the first channel. In this case, when the program information about the first channel is obtained, the signal processing device 100a may provide the image of the first channel along with the program information of the first channel.

As described above, according to various embodiments of the present discourse, program information of a channel set to a broadcast channel can be obtained from a broadcast signal consisting of a plurality of physical layer pipes (PLPs) without omission.

Referring to FIGS. 1 to 16, according to one aspect of the present disclosure, a signal processing device 100a includes: a broadcast receiver 105 including a tuner; and a controller 170, the controller 170 being configured to: receive, via the tuner, a broadcast signal consisting of a plurality of physical layer pipes (PLPs) corresponding to a plurality of channels; determine, from among the plurality of PLPs, a PLP carrying program information about a first channel, which is a preset broadcast channel; in case where program information about the first channel is provided through a first PLP corresponding to the first channel, process the first PLP to obtain the program information about the first channel; and in case where program information about the first channel is provided through a second PLP corresponding to a second channel, process the second PLP to obtain the program information about the first channel.

In some implementations, the controller 170 may be configured to: determine whether the broadcast signal is a signal including data time-interleaved by a convolutional time interleaver (CTI); and determine, based on the broadcast signal being a signal using the CTI, a PLP carrying program information about the first channel from among the plurality of PLPS.

In some implementations, the broadcast signal may include a preamble 20 including information about the plurality of PLPs, and at least one subframe 30 including the plurality of PLPs. The controller 170 may be configured to determine, based on the preamble, a PLP carrying program information about the first channel from among the plurality of PLPs.

In some implementations, the signal processing device 100a may further include a memory 140 configured to store program information about channels. The controller 170 may be configured to: in case where program information about the first channel is not stored in the memory 140, process the first PLP to provide an image of the first channel upon receiving the broadcast signal; and in case where program information about the first channel is not stored in the memory 140, determine, from among the plurality of PLPs, a PLP carrying program information about the first channel upon receiving the broadcast signal.

In some implementations, the controller 170 may be configured to store, based on the program information about the first channel being obtained, the obtained program information about the first channel in the memory 140.

In some implementations, the controller 170 may be configured to: in case where a PLP carrying program information about the first channel is not present among the plurality of PLPs, store, in the memory 140, a history indicating that program information is not available for the first channel; and process, based on the history being stored in the memory 140, the first PLP to provide an image of the first channel.

In some implementations, the controller 170 may be configured to determine, from among the plurality of PLPs, a PLP carrying program information about the first channel when one of the following conditions occurs: when a first operation of providing an image corresponding to the broadcast channel is initiated while the broadcast channel is preset to the first channel; when the broadcast channel is switched to the first channel; and when the first operation is performed in a background environment while performing a second operation different from the first operation.

According to another aspect of the present disclosure, a signal processing device 100a includes: a broadcast receiver 105 including a tuner; and a controller 170, the controller 170 being configured to: receive, via the tuner, a broadcast signal consisting of a plurality of physical layer pipes (PLPs) corresponding to a plurality of channels; process a first PLP corresponding to the first channel, which is a preset broadcast channel, to determine whether program information about the first channel is provided through the first PLP; in case where program information about the first channel is not provided through the first PLP, determine, from among the plurality of PLPs, a PLP carrying program information about the first channel; and in case where program information about the first channel is provided through a second PLP corresponding to a second channel, process the second PLP to obtain the program information about the first channel.

In some implementations, the controller 170 may be configured to: determine whether the broadcast signal is a signal including data time-interleaved by a convolutional time interleaver (CTI); and determine, based on the broadcast signal being a signal using the CTI, a PLP carrying program information about the first channel from among the plurality of PLPs.

In some implementations, the broadcast signal may include a preamble 20 including information about the plurality of PLPs, and at least one subframe 30 including the plurality of PLPs. The controller 170 may be configured to determine, based on the preamble, a PLP carrying program information about the first channel from among the plurality of PLPs.

In some implementations, the signal processing device 100a may further include a memory 140 configured to store program information about channels. The controller 170 may be configured to: in case where program information about the first channel is stored in the memory 140, process the first PLP to provide an image of the first channel upon receiving the broadcast signal; and in case where program information about the first channel is not stored in the memory 140, process the first PLP to determine whether the program information about the first channel is provided through the first PLP upon receiving the broadcast channel.

In some implementations, the controller 170 may be configured to store, based on the program information about the first channel being obtained, the obtained program information about the first channel in the memory 140.

In some implementations, the controller 170 may be configured to: in case where a PLP carrying program information about the first channel is not present among the plurality of PLPs, store, in the memory 140, a history indicating that program information is not available for the first channel; and process, based on the history being stored in the memory 140, the first PLP to provide an image of the first channel.

In some implementations, the controller 170 may be configured to process the first PLP to determine whether program information about the first channel is provided through the first PLP when one of the following conditions occurs: when a first operation of providing an image corresponding to the broadcast channel is initiated while the broadcast channel is preset to the first channel; when the broadcast channel is switched to the first channel; and when the first operation is performed in a background environment while performing a second operation different from the first operation.

According to another aspect of the present disclosure, an image display apparatus 100 includes: a broadcast receiver 105 including a tuner; a display 180; and a controller 170, the controller 170 being configured to: receive, via the tuner, a broadcast signal consisting of a plurality of physical layer pipes (PLPs) corresponding to a plurality of channels; determine, from among the plurality of PLPs, a PLP carrying program information about a first channel, which is a preset broadcast channel; in case where program information about the first channel is provided through a first PLP corresponding to the first channel, process the first PLP to obtain the program information about the first channel; in case where program information about the first channel is provided through a second PLP corresponding to a second channel, process the second PLP to obtain the program information about the first channel; and process the first PLP after obtaining the program information about the first channel to output, via the display 180, an image of the first channel along with the program information about the first channel.

The above description should not be construed as restrictive in all aspects but considered as illustrative. The scope of the disclosure should be determined by reasonable interpretation of the appended claims and all changes that come within the equivalent scope of the disclosure are included in the scope of the disclosure.

Meanwhile, the method of operating the signal processing device according to the present disclosure may be implemented as processor-readable codes in a processor-readable recording medium. The processor-readable recording medium may be any type of recording device capable of storing data readable by a processor. Examples of the processor-readable recording medium may include a ROM, a RAM, a CD-ROM, a magnetic tape, a floppy disc, and an optical data storage device. Also, the processor-readable recording medium may be implemented as a carrier wave (e.g., data transmission over the Internet). The processor-readable recording medium may be distributed to a computer system connected via a network so that the processor-readable codes may be saved and executed in a distributed manner.

Although the preferred embodiments of the present disclosure have been illustrated and described, those skilled in the art will appreciate that the present disclosure should not be limited to the above specific embodiments and various modifications thereof are possible without departing from the scope and spirit of the disclosure as disclosed in the accompanying claims and these modifications should not be understood independently of the technical idea of the present disclosure.

What is claimed is:

1. A signal processing device comprising:
a memory;
a broadcast receiver including a tuner; and
a controller,
wherein the controller is configured to:
receive, via the tuner, a broadcast signal consisting of a plurality of physical layer pipes (PLPs) corresponding to a plurality of channels;
determine whether information on a broadcast program of a first channel preset as a broadcast channel is stored in the memory;
based on the information on the broadcast program of the first channel not being stored in the memory, determine, from among the plurality of PLPs, a PLP carrying the information on the broadcast program of the first channel;
based on the information on the broadcast program of the first channel being provided through a first PLP corresponding to the first channel, process the first PLP to obtain the information on the broadcast program of the first channel;
based on the information on the broadcast program of the first channel being provided through a second PLP corresponding to a second channel, process the second PLP to obtain the information on the broadcast program of the first channel; and
output, via a display, a screen including an object indicating that the information on the broadcast program of the first channel is being obtained while obtaining the information on the broadcast program of the first channel.

2. The signal processing device of claim 1, wherein the controller is configured to:
determine, based on the information on the broadcast program of the first channel not being stored in the memory, whether the broadcast signal is a signal including data time-interleaved by a convolutional time interleaver (CTI); and
determine, based on the broadcast signal being a signal using the CTI, a the PLP carrying the information on the broadcast program of the first channel from among the plurality of PLPS.

3. The signal processing device of claim 1, wherein the broadcast signal includes a preamble including information about the plurality of PLPs, and at least one subframe including the plurality of PLPs, and
wherein the controller is configured to determine, based on the preamble, the PLP carrying the information on the broadcast program of the first channel from among the plurality of PLPs.

4. The signal processing device of claim 1,
wherein the controller is configured to
based on the information on the broadcast program of the first channel being stored in the memory, process the first PLP to provide an image of the first channel upon receiving the broadcast signal.

5. The signal processing device of claim 4, wherein the controller is configured to store, based on the information on the broadcast program of the first channel being obtained, the obtained information on the broadcast program of the first channel in the memory.

6. The signal processing device of claim 4, wherein the controller is configured to:

based on the PLP carrying the information on the broadcast program of the first channel not being present among the plurality of PLPs, store, in the memory, a history indicating that the information on the broadcast program of the first channel is not available for the first channel; and
process, based on the history being stored in the memory, the first PLP to provide an image of the first channel.

7. The signal processing device of claim 1, wherein the controller is configured to determine whether the information on the broadcast program of the first channel preset is stored in the memory when one of the following conditions occurs:
when a first operation of providing an image corresponding to the broadcast channel is initiated while the broadcast channel is preset to the first channel;
when the broadcast channel is switched to the first channel; and
when the first operation is performed in a background environment while performing a second operation different from the first operation.

8. A signal processing device comprising:
a memory;
a broadcast receiver including a tuner; and
a controller,
wherein the controller is configured to:
receive, via the tuner, a broadcast signal consisting of a plurality of physical layer pipes (PLPs) corresponding to a plurality of channels;
process a first PLP corresponding to a first channel preset as a broadcast channel;
determine whether information on a broadcast program of the first channel is stored in the memory;
based on the information on the broadcast program of the first channel not being stored in the memory, determine whether the information on the broadcast program of the first channel is provided through the first PLP;
based on the information on the broadcast program of about the first channel is not being provided through the first PLP, determine, from among the plurality of PLPs, a PLP carrying the information on the broadcast program of the first channel;
based on the information on the broadcast program of the first channel being provided through a second PLP corresponding to a second channel, process the second PLP to obtain the information on the broadcast program of the first channel; and
output, via a display, a screen including an object indicating that the information on the broadcast program of the first channel is being obtained while obtaining the information on the broadcast program of the first channel.

9. The signal processing device of claim 8, wherein the controller is configured to:
determine, based on the information on the broadcast program of the first channel not being stored in the memory, whether the broadcast signal is a signal including data time-interleaved by a convolutional time interleaver (CTI); and
determine, based on the broadcast signal being a signal using the CTI, the PLP carrying the information on the broadcast program of the first channel from among the plurality of PLPs.

10. The signal processing device of claim 8, wherein the broadcast signal includes a preamble including information about the plurality of PLPs, and at least one subframe including the plurality of PLPs, and wherein the controller is configured to determine, based on the preamble, the PLP carrying the information on the broadcast program of the first channel from among the plurality of PLPs.

11. The signal processing device of claim 8, further wherein the controller is configured to based on the information on the broadcast program of the first channel being stored in the memory, process the first PLP to provide an image of the first channel upon receiving the broadcast signal.

12. The signal processing device of claim 11, wherein the controller is configured to store, based on the information on the broadcast program of the first channel being obtained, the obtained information on the broadcast program of the first channel in the memory.

13. The signal processing device of claim 11, wherein the controller is configured to:

based on the PLP carrying information on the broadcast program of the first channel not being present among the plurality of PLPs, store, in the memory, a history indicating that the information on the broadcast program of the first channel is not available for the first channel; and process, based on the history being stored in the memory, the first PLP to provide an image of the first channel.

14. The signal processing device of claim 8, wherein the controller is configured to process the first PLP when one of the following conditions occurs:

when a first operation of providing an image corresponding to the broadcast channel is initiated while the broadcast channel is preset to the first channel;

when the broadcast channel is switched to the first channel; and when the first operation is performed in a background environment while performing a second operation different from the first operation.

15. An image display apparatus comprising:
a broadcast receiver including a tuner;
a display;
a memory; and
a controller,
wherein the controller is configured to:
receive, via the tuner, a broadcast signal consisting of a plurality of physical layer pipes (PLPs) corresponding to a plurality of channels;
determine whether information on a broadcast program of a first channel preset as a broadcast channel is stored in the memory;
based on the information on the broadcast program of the first channel not being stored in the memory, determine, from among the plurality of PLPs, a PLP carrying the information on the broadcast program of the first channel;
based on the information on the broadcast program of the first channel being provided through a first PLP corresponding to the first channel, process the first PLP to obtain the information on the broadcast program of the first channel;
based on the information on the broadcast program of the first channel being provided through a second PLP corresponding to a second channel, process the second PLP to obtain the information on the broadcast program of the first channel;
output, via the display, a screen including an object indicating that the information on the broadcast program of the first channel is being obtained while obtaining the information on the broadcast program of the first channel; and
process the first PLP after obtaining the information on the broadcast program of the first channel to output, via the display, an image of the first channel along with the information on the broadcast program of the first channel.

* * * * *